(12) United States Patent
Kato (10) Patent No.: US 12,248,236 B2
(45) Date of Patent: Mar. 11, 2025

(54) IMAGE DISPLAY DEVICE

(71) Applicant: Sharp NEC Display Solutions, Ltd., Tokyo (JP)

(72) Inventor: Yuichi Kato, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 342 days.

(21) Appl. No.: 17/791,357

(22) PCT Filed: Jan. 31, 2020

(86) PCT No.: PCT/JP2020/003702
§ 371 (c)(1),
(2) Date: Jul. 7, 2022

(87) PCT Pub. No.: WO2021/152827
PCT Pub. Date: Aug. 5, 2021

(65) Prior Publication Data
US 2023/0045453 A1  Feb. 9, 2023

(51) Int. Cl.
*G03B 21/14* (2006.01)

(52) U.S. Cl.
CPC .................. *G03B 21/145* (2013.01)

(58) Field of Classification Search
CPC .................................................. G03B 21/119
USPC ........................................................ 353/119
See application file for complete search history.

(56) References Cited

U.S. PATENT DOCUMENTS

| 2005/0185145 A1 | 8/2005 | Halsberghe et al. |
| 2005/0195504 A1 | 9/2005 | Von Poncet et al. |

FOREIGN PATENT DOCUMENTS

| JP | H05281509 A | * 10/1993 |
| JP | 2001-215641 A | 8/2001 |
| JP | 2001-235795 A | 8/2001 |
| JP | 2009075228 A | * 4/2009 |
| JP | 2011-076027 A | 4/2011 |
| WO | WO 2019/138115 A1 | 7/2019 |

OTHER PUBLICATIONS

Translation of JP2009075228 (Year: 2024).*
Translation of JPH05281509A (Year: 2024).*
International Search Report (ISR) (PCT Form PCT/ISA/210), in PCT/JP2020/003702, dated Mar. 31, 2020.

* cited by examiner

*Primary Examiner* — Jerry L Brooks
(74) *Attorney, Agent, or Firm* — McGinn Intellectual Property Law Group, PLLC

(57) ABSTRACT

An image display device is provided that allows easy adjustment of positional deviation in an optical axis direction of an optical modulation element from the outside. The image display device includes: a housing including an operation surface; an optical modulation element that is housed in the housing and that includes an image-forming surface that modulates light to form an image; a holding portion that movably holds the optical modulation element at least in a direction perpendicular to the image-forming surface; and an adjusting portion including at least one wire member, one end of the wire member being connected to the holding portion and the other end rotatably attached to the operation surface. Holding portion includes a movable portion that is moved in a direction perpendicular to the image-forming surface by the rotation of the other end of the wire member.

11 Claims, 6 Drawing Sheets

IMAGE DISPLAY DEVICE

TECHNICAL FIELD

The present invention relates to an image display device including an optical modulation element.

BACKGROUND ART

Patent Document 1 describes an image display device including two or more optical modulation elements. Each optical modulation element produces images of a different color from the others. A system, including lenses and prisms, etc., projects images of each color produced by each optical modulation element on a screen in an overlapped manner.

When a relative pixel position deviation occurs between the images of each color formed by each optical modulation element, the image quality of the projected image deteriorates. To solve this problem, the image display device includes a plate assembly that movably supports, for each optical modulation element, the optical modulation element in a direction perpendicular to the optical axis, and a flexible tube for adjusting the amount of movement of the optical modulation element, one end of the flexible tube being coupled to the plate assembly. The other end of the flexible tube is attached to a predetermined surface of the housing. The user can adjust the amount of movement of the optical modulation element by rotating the other end of the flexible tube. This makes it possible to adjust the deviation of the relative pixel positions for the images of each color.

PRIOR ART DOCUMENT

Patent Document

Patent Document 1: U.S. Patent Application Publication No. 2005/0195504

DISCLOSURE OF THE INVENTION

Problems to be Solved by the Invention

However, the image display device disclosed in Patent Document 1 has the following problems.

Recently, higher output of image display devices has been achieved. In a high-power image display device, the temperature of the optical components inside the device increases with an increase in the internal temperature. As a result, because of the thermal expansion of the optical components, cases occur in which a deviation occurs in the position of the optical modulation element on the optical axis. Positional deviation of the optical modulation element on the optical axis (positional deviation in the optical axis direction) reduces the image quality of the projected image. In the image display device described in Patent Document 1, it is impossible to adjust the deviation of the optical axis direction of the optical modulation element.

An object of the present invention is to provide an image display device capable of solving the above problems and that allows easy adjustment of the positional deviation in the optical axis direction of the optical modulation element from the outside.

Means for Solving the Problems

In order to achieve the above object, according to one aspect of the present invention, there is provided an image display device that includes a housing that includes an operation surface, and an optical modulation element that is housed in the housing and that includes an image-forming surface that modulates light to form an image; the image display device comprising: a holding portion that movably holds the optical modulation element at least in a direction perpendicular to the image-forming surface; and an adjusting portion that is composed of at least one wire member, one end of the wire member being connected to the holding portion and the other end of the wire member being rotatably attached to the operation surface, wherein the holding portion includes a movable portion that moves in a direction perpendicular to the image-forming surface by the rotation of the other end of the wire member.

BEST MODE FOR CARRYING OUT INVENTION

Next, embodiments of the present invention will be described with reference to the drawings.

First Embodiment

Figure 1:
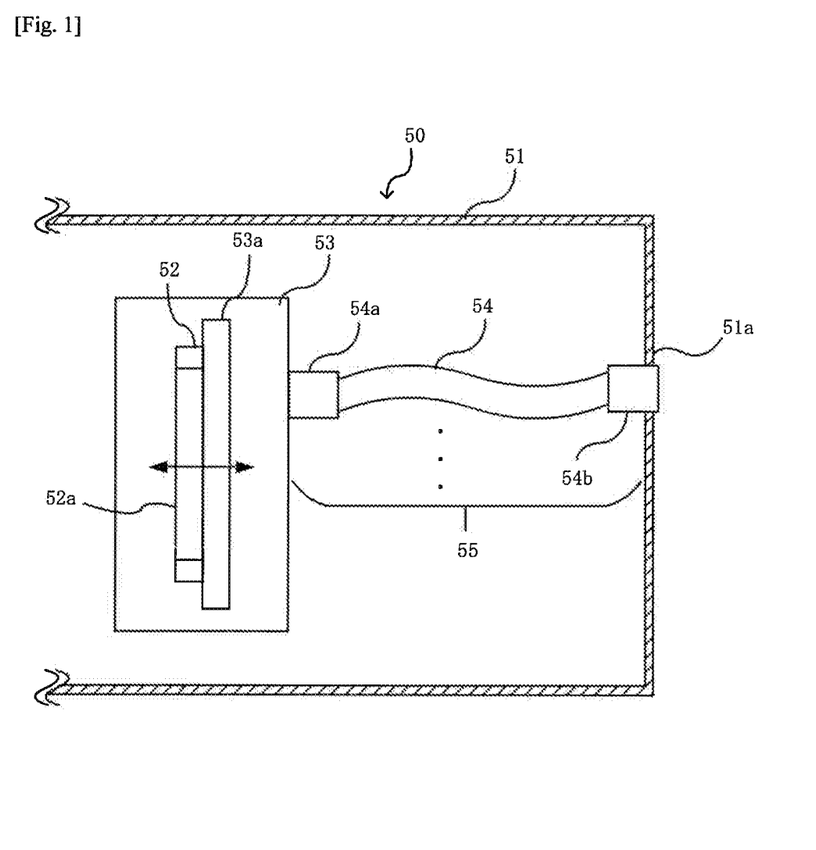
FIG. 1 is a block diagram showing a configuration of an image display device according to a first embodiment of the present invention.

FIG. 1 is a block diagram showing a configuration of an image display device according to a first embodiment of the present invention.

Referring to FIG. 1, image display device 50 includes housing 51 including operation surface 51*a*. Optical modulation element 52 that includes image-forming surface 52*a* that modulates light to form an image is accommodated in housing 51. Optical modulation element 52 is, for example, a DMD (Digital Mirror Device) or an LCD (Liquid Crystal Display).

Image display device 50 further includes holding portion 53 and adjusting portion 55. Holding portion 53 movably holds optical modulation element 52 in a direction perpendicular to at least the image-forming surface 52*a*. Adjusting portion 55 is composed of at least one wire member 54. One end 54*a* of wire member 54 is connected to holding portion 53, and other end 54*b* is rotatably attached to operation surface 51*a*. Holding portion 53 includes movable portion 53*a* that moves in a direction perpendicular to image-forming surface 52*a* by the rotation of other end 54*b* of wire member 54.

According to image display device 50 of this embodiment, since other end 54*b* of wire member 54 is exposed on operation surface 51*a*, the user can rotate other end 54*b* from the outside of housing 51. When other end 54*b* rotates, movable portion 53*a* moves in a direction perpendicular to image-forming surface 52*a* with this rotation. Here, since the direction perpendicular to image-forming surface 52*a* corresponds to the optical axis direction, optical modulation element 52 moves back and forth along the optical axis with the movement of movable portion 53*a*. Thus, it is possible to adjust the positional deviation of optical modulation element 52 in the optical axis direction. In this way, it is possible to easily adjust the positional deviation of optical modulation element 52 in the optical axis direction from the outside.

Image display device 50 of the present embodiment is not limited to the configuration shown in FIG. 1. The following modifications may be applied to image display device 50.

Holding portion 53 may include a first movable plate that includes a supporting portion for supporting optical modulation element 52. The first movable plate includes a hinge that connects the supporting portion with the outer edge of the plate. As the hinge deflects, the supporting portion moves in a direction perpendicular to the plate surface (a direction perpendicular to image-forming surface 52*a*).

In the above case, the hinge may be composed of a plurality of slots that are formed extending in the circumferential direction so as to surround the supporting portion. The hinge may be formed by a pair of first right-angled slots that are provided facing each other so as to surround the supporting portion, and a pair of second right-angled slots that are provided facing each other so as to surround the portion where the pair of first right-angled slots is formed. In this case, each corner of the pair of first right-angled slots and each corner of the pair of second right-angled slots are located on respective diagonal lines.

In the above modification, holding portion 53 may further include a fixed plate which is fixed to housing 51 and a first elastic member which is provided between the supporting portion of the first movable plate and the fixed plate. In this case, the first movable plate has a plurality of first through-holes that are formed along the circumferential direction on the outer peripheral portion of the supporting portion. Adjusting portion 55 includes a plurality of first wire members, one end of each first wire member being connected to the fixed plate via a respective first through-hole. Each of the first wire members includes a first projecting portion on one end side, this first projecting portion abutting against a portion of the side of supporting portion that is opposite to the fixed plate side, and male screw threading being formed on the outer surface of this one end. The fixed plate includes a plurality of first holes that are provided for each first wire member, these first holes having female screw threading formed on the inner surfaces thereof. When the other end of each first wire member is rotated in a state in which the male screw threading of the first wire member is engaged with the female screw threading of a first hole, the supporting portion moves in a direction perpendicular to the plate surface.

In the above modification, the first elastic member may be composed of a plurality of spring members which are provided for each first wire member.

Further, the holding portion may include a plurality of second movable plates that each include at least one second through-hole, and a second elastic member that is provided between each of the plurality of second movable plates and the fixed plate. In this case, the adjusting portion includes a plurality of second wire members, one end of each second wire member being connected to the fixed plate via a respective second through-hole of the plurality of second movable plates. The plurality of second movable plates is joined to the outer edge of the first movable plate such that the surfaces of the second movable plates on which the second through-holes are formed are perpendicular to each other and are perpendicular to the plate surface of the first movable plate. Each of the second wire members includes a second projecting portion on one end side that abuts against a surface of the second movable plate on the side opposite the fixed plate side, and male screw threading is formed on the outer surface of this one end.

The fixed plate includes a plurality of second holes that are provided for each second wire member, these second holes having female screw threading formed on the inner surfaces thereof. When the other end of a second wire member is rotated in a state in which the male screw threading of the second wire member is engaged with the female screw threading of the second hole, the second movable plate moves in a direction parallel to the image-forming surface (a direction perpendicular to the optical axis).

In the above case, the second elastic member may be composed of a plurality of spring members that are provided for each second wire member.

Further, the above modification may further include a projection lens that projects an image formed by the optical modulation element. Further, the above modification may include a plurality of optical modulation elements, each optical modulation element forming an image of a color different from the others. In this case, holding portion 53 and adjusting portion 55 are provided for each optical modulation element. The projection lens projects images of each color formed by the optical modulation elements in an overlapped manner.

Second Embodiment

Figure 2:
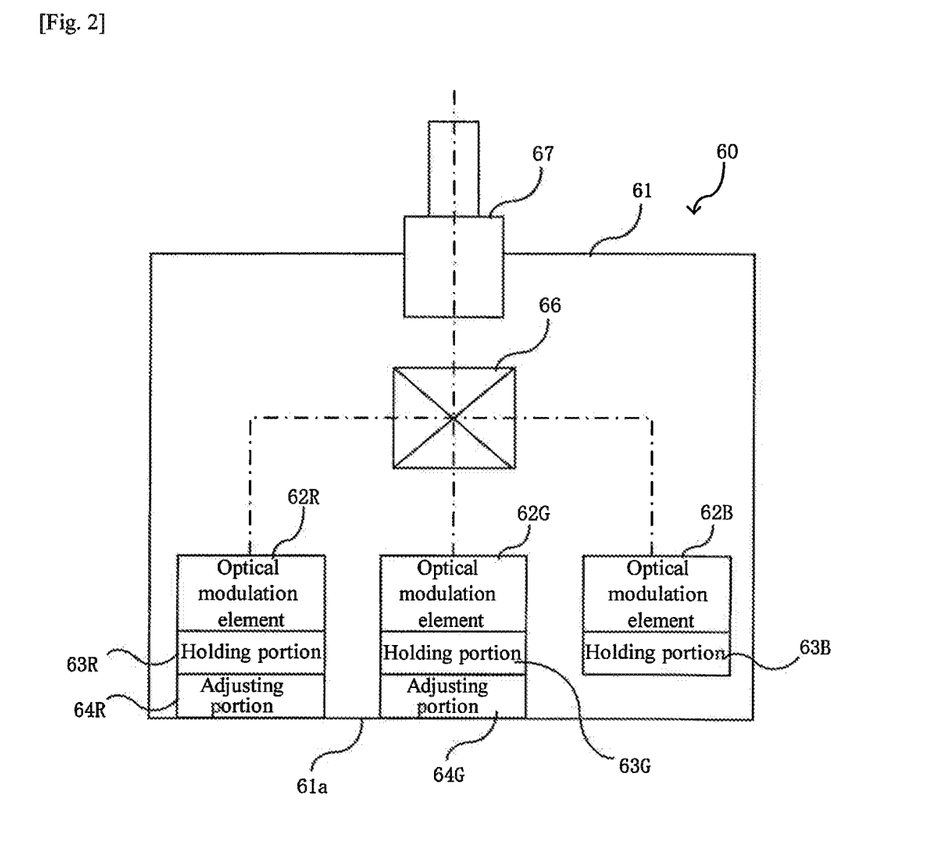
FIG. 2 is a schematic diagram showing a configuration of an image display device according to a second embodiment of the present invention.

FIG. 2 is a schematic diagram showing a configuration of an image display device according to the second embodiment of the present invention. In FIG. 2, for convenience, only configuration relating to the featured portion of the image display device is shown, and the light source and optical components such as mirrors and lenses are omitted.

Referring to FIG. 2, image display device 60 includes housing 61 having operation surface 61*a*. Three optical modulation elements 62R, 62G, 62B and color-combining prism 66 are housed in housing 61. Projection lens 67 is also provided in housing 61.

Optical modulation elements 62R, 62G, 62B form images of colors that differ from each other. Here, optical modulation element 62R modulates red light to form a red image. Optical modulation element 62G modulates green light to form a green image. Optical modulation element 62B modulates blue light to form a blue image.

Color-combining prism 66 synthesizes the images of each color formed by optical modulation elements 62R, 62G, 62B into one image. Projection lens 67 projects an image synthesized by color-combining prism 66 on a screen (not shown).

Optical modulation elements 62R, 62G, 62B are fixed to housing 61 together with color-combining prism 66 via holding portions 63R, 63G, 63B, respectively. In the present embodiment, adjusting portions 64R, 64G are provided to optical modulation elements 62R, 62G, respectively.

Holding portion 63R movably holds optical modulation element 62R in a direction perpendicular to and parallel to the image-forming surface thereof. Here, the direction perpendicular to the image-forming plane is the optical axis direction, and the direction parallel to the image-forming plane is a direction perpendicular to the optical axis. Adjusting portion 64R is configured so that the user can adjust the amount of movement of optical modulation element 62R on holding portion 63R from operation surface 61a.

Similar to holding portion 63R, holding portion 63G movably holds optical modulation element 62G in a direction perpendicular to and parallel to the image-forming surface thereof, and holding portion 63B movably holds optical modulation element 62B in a direction perpendicular to and parallel to the image-forming surface thereof. Adjusting portion 64G is configured so that the user can adjust the amount of movement of optical modulation element 62G on holding portion 63G from operation surface 61a.

Hereinafter, the configurations of holding portions 63R, 63G, 63B and adjusting portions 64R, 64G will be described in detail.

Figure 3:
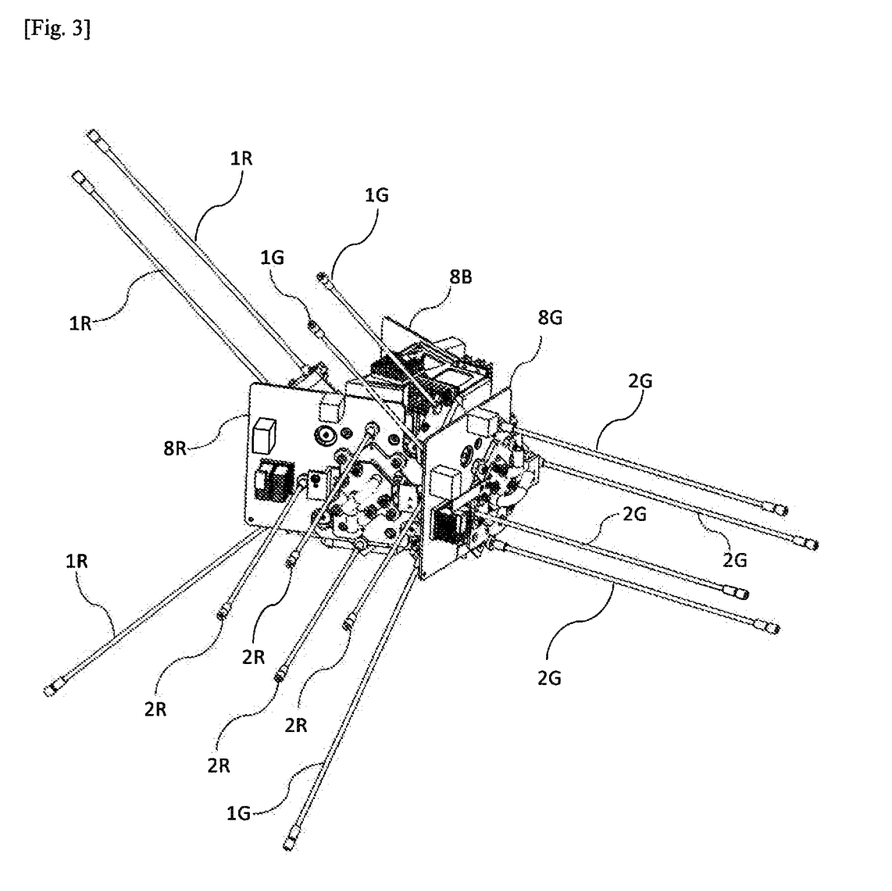
FIG. 3 is a schematic view showing the appearance of a unit including an optical modulation element, a holding portion, an adjusting portion, and a color combining prism.

FIG. 3 is a diagram showing the external appearance of a unit that includes optical modulation elements 62R, 62G, 62B, holding portions 63R, 63G, 63B, adjusting portions 64R, 64G, and color-combining prism 66.

As shown in FIG. 3, optical modulation elements 62R, 62G, 62B and color-combining prism 66 are incorporated in one unit. Electric substrate 8R includes a circuit or the like required to drive optical modulation element 62R and is assembled around holding portion 63R. Electric substrate 8G includes a circuit or the like required to drive optical modulation element 62G and is assembled around holding portion 63G. Electric substrate 8B includes a circuit or the like required to drive optical modulation element 62B and is assembled around holding portion 63B.

Adjusting portion 64R includes three wire members 1R and four wire members 2R. Three wire members 1R are used for pixel position adjustment for moving optical modulation element 62R in a direction parallel to the image-forming surface (a direction perpendicular to the optical axis). Four wire members 2R are used for focus adjustment for moving optical modulation element 62R in a direction perpendicular to the image-forming surface (the optical axis direction). Similarly, adjusting portion 64G also includes three wire members 1G and four wire members 2G.

Figure 4:
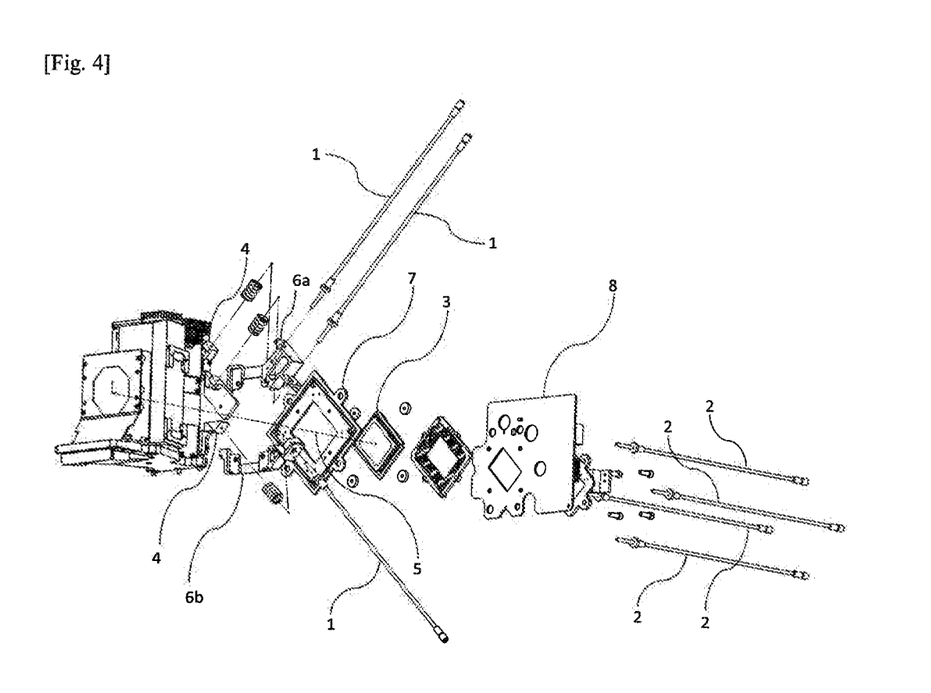
FIG. 4 is an exploded view schematically showing the configuration of the unit shown in FIG. 3.

FIG. 4 is an exploded view showing the configuration including optical modulation element (62R or 62G), holding portion (63R or 63G), and adjusting portion (64R or 64G) in the unit shown in FIG. 3.

Referring to FIG. 4, the holding portion includes fixed plate 4 fixed to housing 61, two movable plates 6a and 6b, and movable plate 7 having the shape of a square. An opening for attaching optical modulation element 3 is formed at the central part of movable plate 7. Movable plate 6a is joined to one of two adjacent sides of the outer edge of movable plate 7. Movable plate 6b is joined to the other of the two adjacent sides of the outer edge of movable plate 7. For example, an adhesive can be used to join movable plates 6a and 6b with movable plate 7.

The adjusting portion includes three wire members 1 for pixel position adjustment and four wire members 2 for focus adjustment. Two of three wire members 1 are connected to fixed plate 4 via movable plate 6a, and the remaining one is connected to fixed plate 4 via movable plate 6b. Four wire members 2 are connected to fixed plate 4 via movable plate 7. Electric substrate 8 is mounted with components necessary for driving optical modulation element 3 and is disposed on the side opposite to the fixed plate 4 side of movable plate 7.

In focus adjustment, movable plate 7 can be moved in a direction along optical axis 5 (a direction perpendicular to the image-forming surface) by rotating the four wire members 2.

In pixel position adjustment, movable plate 6a can be moved in a first direction perpendicular to optical axis 5 by rotating two wire members 1 of the movable plate 6a side. By rotating wire member 1 of the movable plate 6b side, movable plate 6b can be moved in a second direction perpendicular to the optical axis 5 and perpendicular to the first direction.

The image-forming surface of optical modulation element 3 has a plurality of pixels arranged in, for example, a matrix. The direction of movement of movable plate 6a (first direction) corresponds to the row direction of the pixels, and the direction of movement of movable plate 6b (second direction) corresponds to the column direction of the pixels. Incidentally, by individually adjusting the amount of rotation of two wire members 1 of the movable plate 6a side, it is also possible to rotate optical modulation element 3 in the in-plane direction of the image-forming surface.

Figure 5:
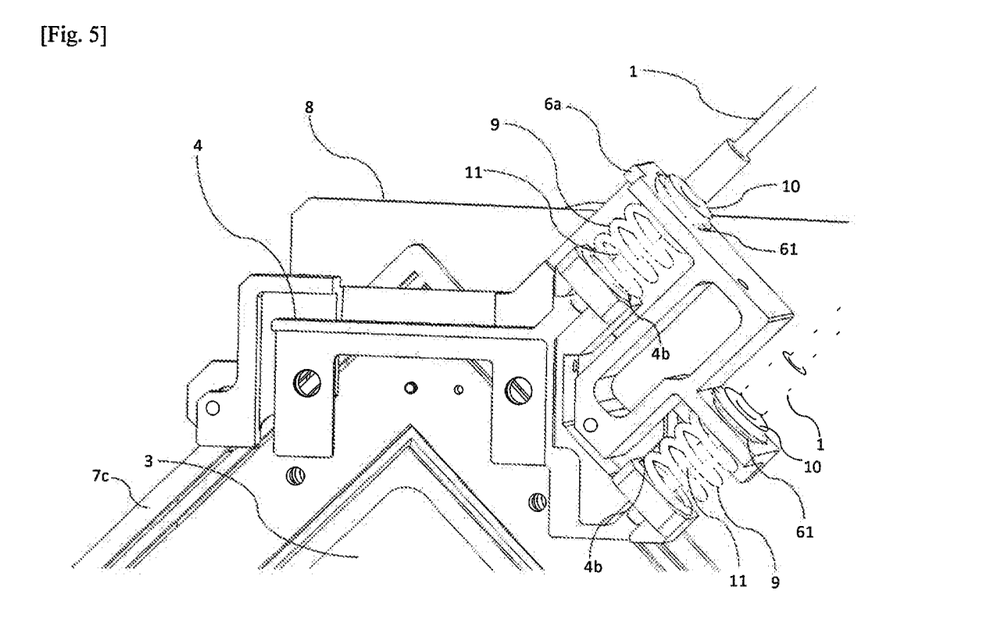
FIG. 5 is a schematic view showing a connecting portion of a movable plate for pixel position adjustment.

FIG. 5 is a schematic view showing a portion where two wire members 1 are connected to fixed plate 4 via movable plate 6a.

As shown in FIG. 5, movable plate 6a is joined to outer edge portion 7c of movable plate 7. Movable plate 6a includes two through-holes 61. Spring members 9, which are second elastic members, are provided between the part of each through-hole 61 of movable plate 6a and fixed plate 4. Spring member 9 is provided for each through-hole 61.

Second hole 4b for inserting wire member 1 is provided in a portion of fixed plate 4 facing through-hole 61. Male screw threading 11 is formed on the outer surface of one end of wire member 1. Female screw threading that engages with male screw threading 11 is formed on the inner surface of second hole 4b. Disc-shaped portion 10 is further provided at one end of wire member 1. One end of wire member 1 passes through through-hole 61 of movable plate 6a and is inserted through spring member 9 and into second hole 4b. Disk-shaped portion 10 is in contact with the surface opposite to the fixed plate 4 side of movable plate 6a.

The other end of wire member 1 is rotatably attached to operation surface 61a. The other end of wire member 1 is rotated in a state in which male screw threading 11 is engaged with the female screw threading of second hole 4b. If the other end of wire member 1 is rotated clockwise, movable plate 6a is moved by the driving force of the screw threading. If the other end of wire member 1 is rotated counterclockwise, movable plate 6a is moved by the repulsive force of spring member 9. Here, in the case of clockwise rotation, movable plate 6a is moved so that the distance between movable plate 6a and fixed plate 4 is narrowed. On the other hand, in the case of counterclockwise rotation, movable plate 6a is moved so that the distance between movable plate 6a and fixed plate 4 is extended.

Movable plate 6b is also of the same configuration as movable plate 6a, but the number of through-holes 61 is one. Fixed plate 4 is provided with second hole 4b at a portion facing through-hole 61. One end of wire member 1 passes through through-hole 61 of movable plate 6b and is inserted through spring member 9 and into second hole 4b. The diameter of disk-shaped portion 10 is larger than the diameter of through-hole 61. Disk-shaped portion 10 is in contact with the surface of movable plate 6b opposite to the fixed plate 4 side. In a state where male screw threading 11 is engaged with the female screw threading of second hole 4b, movable plate 6b is moved by rotating the other end of wire member 1.

Figure 6:
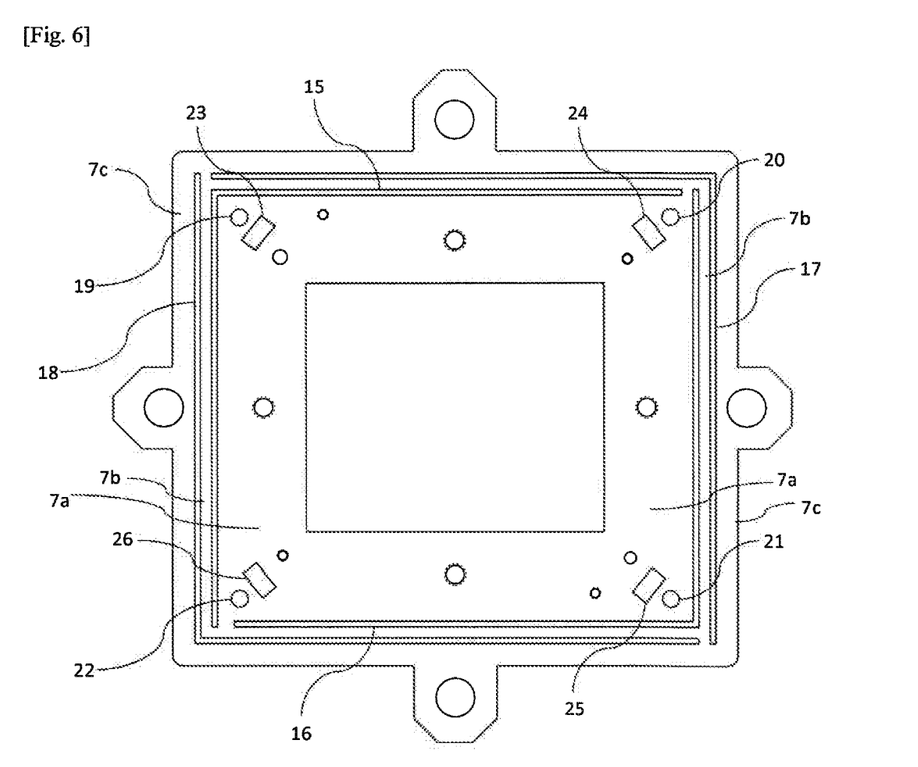
FIG. 6 is a front view showing an example of a movable plate for focus adjustment.

FIG. 6 is a front view of movable plate 7. As shown in FIG. 6, movable plate 7 has a rectangular shape and includes supporting portion 7a in which an opening for supporting optical modulation element 3 is provided at the center. Supporting portion 7a is connected to the outer edge 7c of the plate via hinge 7b. As hinge 7b deflects, support portion 7a is moved in a direction perpendicular to the plate surface. Hinge 7b is constituted by a plurality of slots that are formed extending in the circumferential direction so as to surround supporting portion 7a. More specifically, hinge 7b is formed by four right-angled slots 15 to 18, each right-angled slot being composed of two straight slots joined at one end at a right angle, and the four right-angled slots 15-18 being formed so as to surround supporting portion 7a. Slots 15 and 16 are provided so as to face each other across supporting portion 7a. Slots 17 and 18 are provided so as to face each other, and further, surround the portion that is surrounded by right-angled slots 15 and 16. The corner portions of each of right-angled slots 15-18 are positioned diagonally from each other.

Movable plate 7 further includes four through-holes 19 to 22 which are formed along the circumferential direction on the outer peripheral portion of supporting portion 7a. Through-hole 19 is provided in the vicinity of the corner portion of right-angled slot 15. Through-hole 20 is provided in the vicinity of the corner portion of right-angled slot 17. Through-hole 21 is provided in the vicinity of the corner portion of right-angled slot 16. Through-hole 22 is provided in the vicinity of the corner portion of right-angled slot 18. Four wire members 2 are coupled to fixed plate 4 via four through-holes 19-22, respectively.

Supporting portion 7a is further provided with projecting portions 23 to 26 in the vicinity of through-holes 19 to 22, respectively. A disc-shaped portion formed at one end of wire member 2 butts against each of projecting portions 23 to 26.

Figure 7:
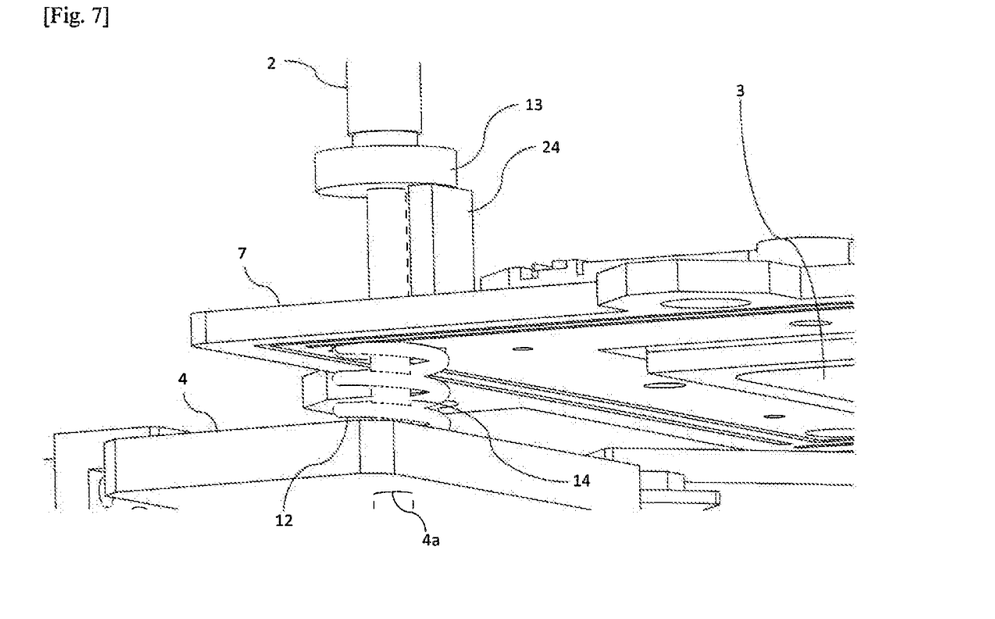
FIG. 7 is a schematic view showing a connecting portion of the movable plate shown in FIG. 6.

FIG. 7 is a schematic view showing a portion where wire member 2 is connected to fixed plate 4 via movable plate 7.

As shown in FIG. 7, first hole 4a for inserting wire member 2 is provided in the portion of fixed plate 4 facing through-hole 20. Male screw threading 14 is formed on the outer surface of one end of wire member 2. Female screw threading that engages with male screw threading 14 is formed on the inner surface of first hole 4a. Disc-shaped portion 13 is further provided at one end of wire member 2. One end of wire member 2 passes through through-hole 20 of movable plate 7 and is inserted through spring member 12 and into first hole 4a. Disk-shaped portion 13 abuts against projecting portion 24 which is formed on the opposite surface of movable plate 7 from fixed plate 4. The diameter of disk-shaped portion 13 is preferably larger than diameter of through-hole 20.

The other end of wire member 2 is rotatably attached to operation surface 61a. The other end of wire member 2 is rotated in a state in which male screw threading 14 is engaged with the female screw threading of first hole 4a. If the other end of wire member 2 is rotated clockwise, supporting portion 7a of movable plate 7 is moved by the driving force of the screw threading in a direction perpendicular to the plate surface. If the other end of wire member 2 is rotated counterclockwise, supporting portion 7a of movable plate 7 is moved by the repulsive force of spring member 12 in a direction perpendicular to the plate surface. Here, in the case of clockwise rotation, supporting portion 7a is moved so that the distance between supporting portion 7a and fixed plate 4 is narrowed. On the other hand, in the case of counterclockwise rotation, supporting portion 7a is moved so that the distance between supporting portion 7a and fixed plate 4 is extended.

The remaining three through-holes 19, 21, 22 of movable plate 7 have the same coupling structure as the coupling portion between wire member 2 and fixed plate 4 through through-hole 20.

Incidentally, as movable plates 6a and 6b move, movable plate 7 is moved in a direction perpendicular to the optical axis (in-plane direction). Therefore, each of through-holes 19 to 22 is formed in a size such that the hole does not contact wire member 2 even when movable plate 7 moves in the in-plane direction.

Figure 8:
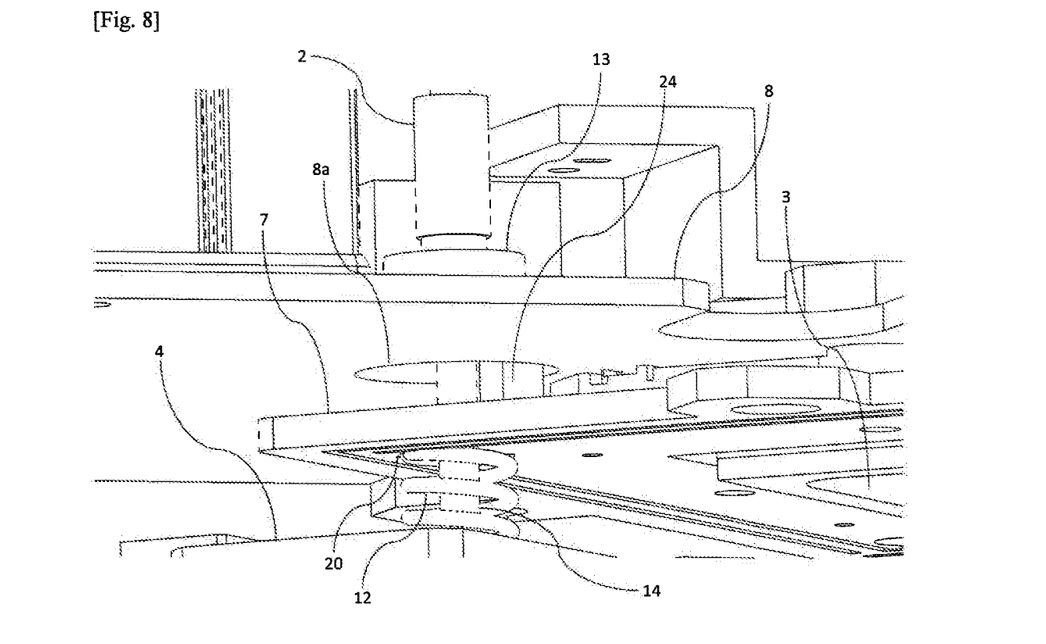
FIG. 8 is a schematic view for explaining a connecting portion of an electric substrate.

As shown in FIG. 8, electric substrate 8 includes through-hole 8a for the passage of wire member 2 and projecting portion 24, through-hole 8a being provided in a portion facing through-hole 20 of movable plate 7. Through-hole 8a is also formed in such a size that the hole does not contact with wire member 2 and projecting portion 24 even when movable plate 7 moves in the in-plane direction. Although not shown in FIG. 8, through-holes 8a are also formed in portions of electric substrate 8 that face through-holes 19, 21, and 22 of movable plate 7.

Next, pixel position adjustment and focus adjustment of image display device 60 of the present embodiment will be specifically described.

In pixel position adjustment, the user adjusts the deviation of the relative pixel positions between the images of each color by rotating the other end of each wire member 1 of operation surface 61a clockwise or counterclockwise. Here, the deviation of the pixel positions of the red image and the green image is adjusted with respect to the blue image. For example, when adjusting the deviation of the pixel position of the red image, movable plates 6a and 6b are moved by rotating the other end of each wire member 1 of adjusting portion 64R. The positional deviation in the column direction of the pixels is adjusted by moving movable plate 6a. The positional deviation in the row direction of the pixels is adjusted by moving movable plate 6b. Here, the column and row directions of the pixels correspond to the longitudinal and transverse directions on the screen, respectively. Incidentally, as movable plates 6a and 6b move, movable plate 7 and electric substrate 8 also move the same amount in the same direction, but wire member 2 does not move because wire member 2 is fixed to fixed plate 4. Further, the portion of contact between disk-shaped portion 13 of wire member 2 and movable plate 7 slides. Similarly, the portion of contact between spring member 12 and movable plate 7 also slides.

In focus adjustment, the user adjusts the positional deviation in the optical axis direction of optical modulation element 3 by rotating the other end of each wire member 2 of operation surface 61a clockwise or counterclockwise. Here, the deviation of red optical modulation element 3 and green optical modulation element 3 with respect to blue optical modulation element 3 is adjusted. For example, when adjusting the positional deviation in the optical axis direction of red optical modulation element 3, supporting portion 7a of movable plate 7 is moved by rotating the other end of each wire member 2 of adjusting portion 64R. The positional deviation in the optical axis direction of red optical modulation element 3 is adjusted by moving supporting portion 7a in a direction perpendicular to the plate surface.

According to image display device 60 of the present embodiment, similarly to the first embodiment, it is possible to easily adjust the positional deviation in the optical axis direction of optical modulation element 3 from the outside.

In addition, the deviation of the relative pixel positions between the images of each color can also be easily adjusted.

Note that image display device 60 of the present embodiment is an example of the present invention, and the configuration thereof can be modified as appropriate.

For example, optical modulation element 62B for forming a blue image may be provided with an adjusting portion having the same structure as adjusting portions 64R and 64G.

Further, in movable plate 7, the number and shape of the slots may be changed as appropriate as long as flexible hinge 7b that bends in the direction perpendicular to the plate surface can be formed.

Furthermore, the number of wire members 2 is not limited to four. The number of wire members 2 may be one or more as long as supporting portion 7a can be moved. The number of through-holes is also increased or decreased in accordance with the number of wire members.

The image display device of the present invention can be applied to a general display device comprising an optical modulation element.

EXPLANATION OF REFERENCE NUMBERS 50 image display device
51 housing
51a operation surface
52 optical modulation element
52a image-forming surface
53 holding portion
53a movable portion
54 wire member
54a one end
54b other end
55 adjusting portion

The invention claimed is:

1. An image display device comprising a housing that includes an operation surface and an optical modulation element that is housed in the housing and that includes an image-forming surface that modulates light to form an image, said image display device comprising:
a holding portion that movably holds the optical modulation element at least in a direction perpendicular to the image-forming surface; and
an adjusting portion that is composed of at least one wire member, one end of the wire member being connected to the holding portion, the other end of the wire member being rotatably attached to the operation surface;
wherein the holding portion includes a movable portion which moves in a direction perpendicular to the image-forming surface by the rotation of the other end of the wire member,
wherein the holding portion includes a first movable plate that includes a supporting portion that supports the optical modulation element, and
wherein the first movable plate includes a hinge that connects the supporting portion with an outer edge of the first movable plate, and when the hinge is deflected, the supporting portion is moved in a direction perpendicular to a plate surface.

2. The image display device according to claim 1, wherein the hinge is formed by a plurality of slots that are formed extending in a circumferential direction so as to surround the supporting portion.

3. The image display device according to claim 1, wherein the hinge is formed by a pair of first right-angled slots that are provided to face each other and surround the supporting portion, and a pair of second right-angled slots that are provided to face each other and surround a portion in which the pair of first right-angled slots is formed, each corner of the pair of first right-angled slots and each corner of the pair of second right-angled slots being located on respective diagonal lines.

4. The image display device according to claim 1, wherein the holding portion further includes:
a fixed plate which is fixed to the housing; and
a first elastic member which is provided between the supporting portion and the fixed plate,
wherein the first movable plate includes a plurality of first through-holes which are formed along a circumferential direction on an outer peripheral portion of the supporting portion, and
wherein the adjusting portion includes a plurality of first wire members whose one ends are connected to the fixed plate through the plurality of first through-holes, respectively, and the supporting portion moves in a direction perpendicular to the plate surface by the rotation of the other end of each first wire member.

5. The image display device according to claim 4, wherein each of the first wire members includes a first protrusion on the one end side of the first wire member, the first protrusion abutting on a portion of the side of supporting portion that is opposite to the fixed plate side, and male screw threading being formed on an outer surface of the one end of the first wire member, and
wherein the fixed plate includes a plurality of first holes that are provided for each of the first wire members, female screw threading being formed on an inner surface of each first hole, and the supporting portion moving in a direction perpendicular to the plate surface by the rotation of the other end of the first wire member in a state in which the male screw threading of the first wire member is engaged with the female screw threading of the first hole.

6. The image display device according to claim 4, wherein the first elastic member is composed of a plurality of spring members provided for each of the first wire members.

7. The image display device according to claim 5, wherein the holding portion includes:
a plurality of second movable plates, each including at least one second through-hole; and
a second elastic member which is provided between each of the plurality of second movable plates and the fixed plate,
wherein the adjusting portion includes a plurality of second wire members each having one end connected to the fixed plate via a respective second through-hole of the plurality of second movable plates, and
wherein the plurality of second movable plates are joined to the outer edge portion of the first movable plate so that the surfaces on which the second through-holes are formed are perpendicular to each other and are perpendicular to the plate surface of the first movable plate, and the second movable plates move in directions parallel to the image-forming surface by the rotation of the other end of each of the second wire members.

8. The image display device according to claim 7, wherein each of the second wire members includes a second protrusion on the one end side of the second wire member, the second protrusion abutting on a surface of the side of the second movable plate that is opposite to the fixed plate side, and male screw threading is formed on an outer surface of the one end of the second wire member, and wherein the fixed plate includes a plurality of second holes which are provided for each of the second wire members, female screw threading is formed on an inner surface of each second hole, and the second movable plates move in directions parallel to the image-forming surface by the rotation of the other end of the second wire members in a state in which the male screw threading of the second wire members is engaged with the female screw threading of the second holes.

9. The image display device according to claim 7, wherein the second elastic member is composed of a plurality of spring members provided for each of the second wire members.

10. The image display device according to claim 1, further comprising a projection lens that projects an image formed by the optical modulation element.

11. The image display device according to claim 10, wherein a plurality of optical modulation elements are provided as the optical modulation element, each optical modulation element forming an image of a different color from the others, wherein the holding portion and the adjusting portion are provided for each of the optical modulation elements, and wherein the projection lens projects images of each color formed by each of the optical modulation elements in an overlapped manner.

* * * * *